Sept. 26, 1950      J. C. HONEYCUTT      2,523,624
RODENT OR ANIMAL TRAP
Filed Dec. 20, 1946      2 Sheets-Sheet 1
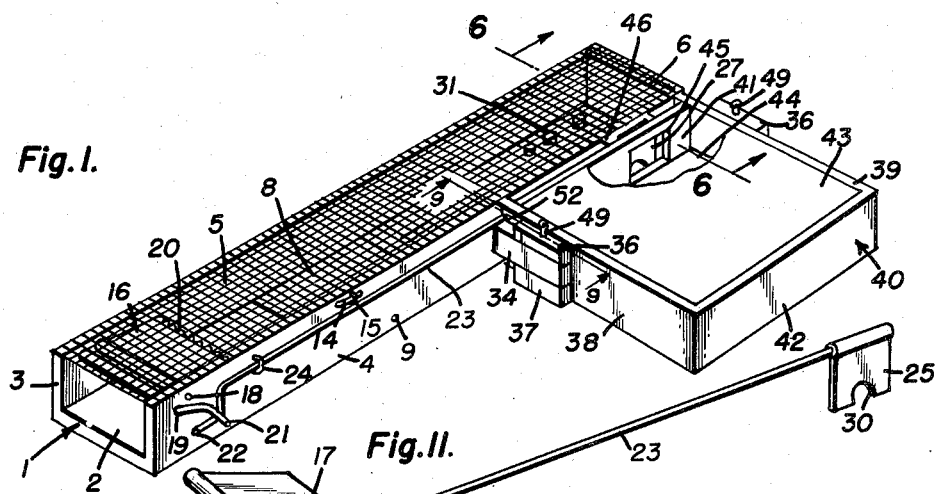
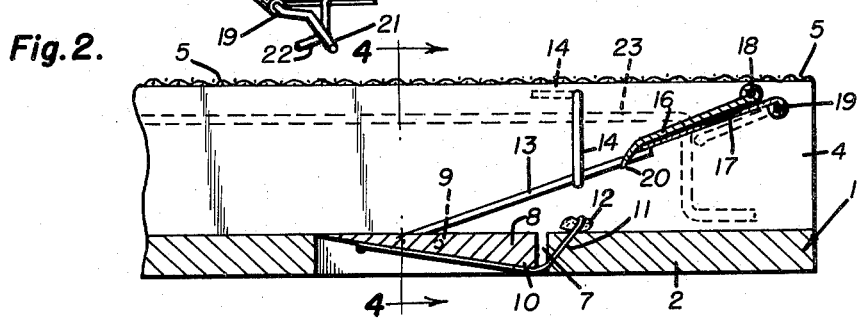
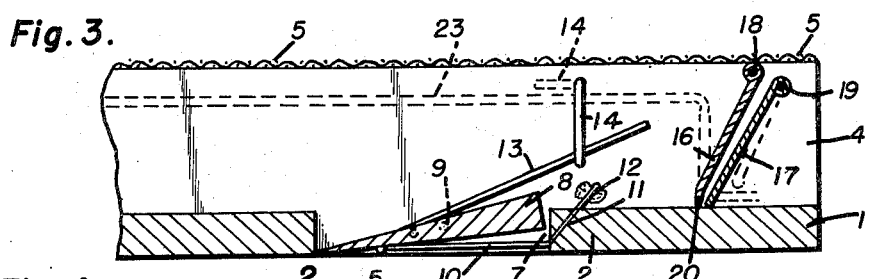
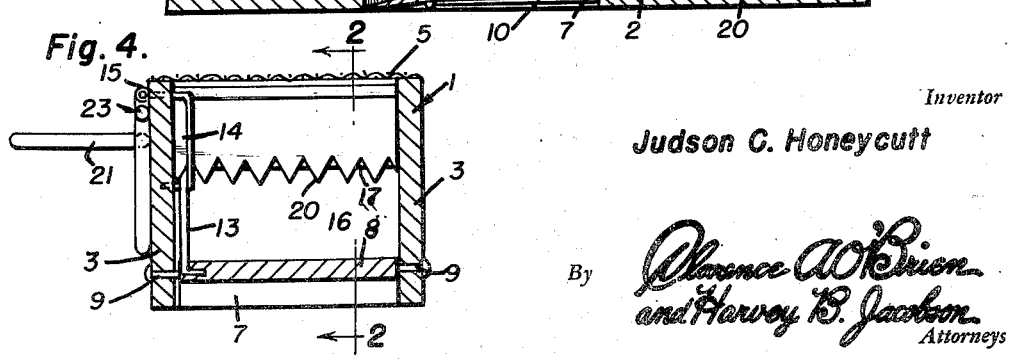
Inventor
Judson C. Honeycutt
By Clarence A. O'Brien
and Harvey B. Jackson
Attorneys Sept. 26, 1950  J. C. HONEYCUTT  2,523,624
RODENT OR ANIMAL TRAP
Filed Dec. 20, 1946  2 Sheets-Sheet 2
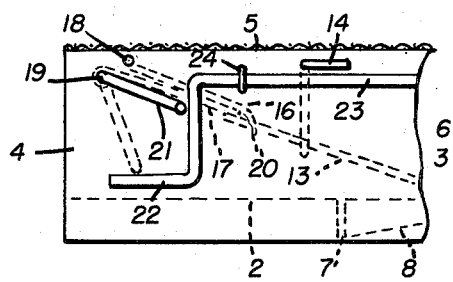
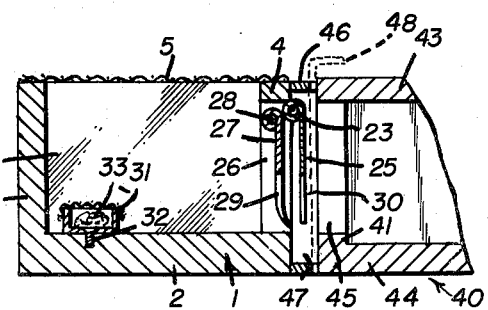
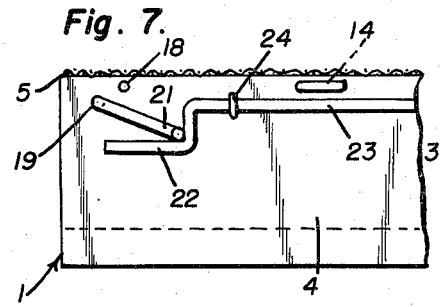
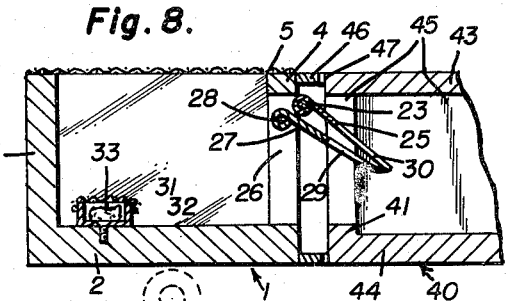
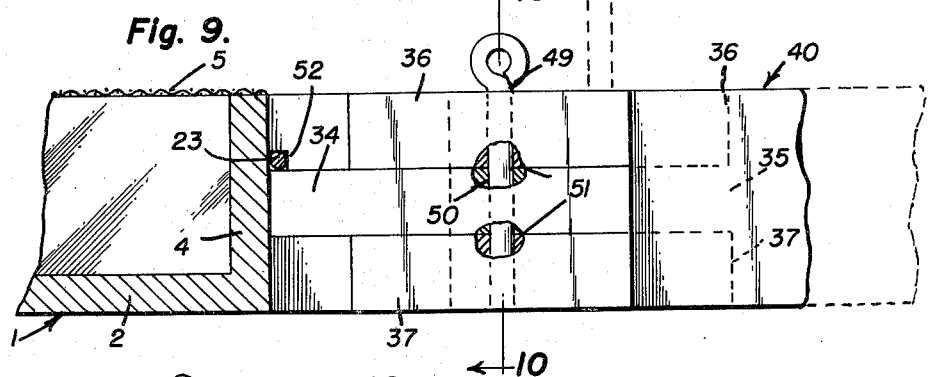
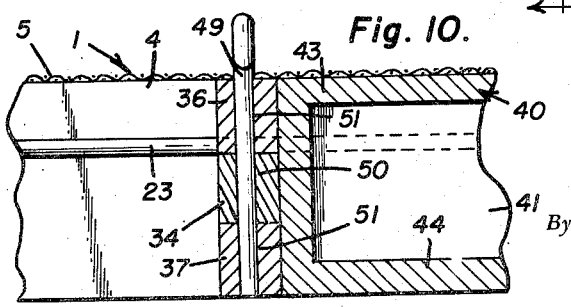
Inventor
Judson C. Honeycutt Patented Sept. 26, 1950

2,523,624

UNITED STATES PATENT OFFICE 2,523,624

RODENT OR ANIMAL TRAP

Judson C. Honeycutt, Whittier, Calif.

Application December 20, 1946, Serial No. 717,500

5 Claims. (Cl. 43—76)

1

This invention relates to improvements in rodent or animal traps.

An object of the invention is to provide an improved rodent or animal trap which will be so constructed that it will be reset by a rodent or animal as it passes into an adjacent trap or cage compartment.

Another object of the invention is to provide an improved rodent or animal trap which will include spaced pivoted arms or flap closures positioned between the entrance of the trap and the forward end of a pivoted trip bait holding platform or trigger together with a pivoted exit flap closure at the opposite end of the trap for controlling the passage of a trapped rodent or animal from the trap into an adjacent detachable cage compartment, said exit flap closure being interconnected with said entrance flaps for automatically resetting the trap as the rodent or animal passes from the interior of the trap through the exit flap closure and into the said cage compartment.

A further object of the invention is to provide an improved form of victim reset animal trap which will include a trap portion and a detachable cage portion secured thereto, providing means for caging the rodents or animals as they are trapped, and simultaneously resetting the trap in readiness to trap other rodents or animals.

Another object of the invention is to provide an improved victim reset rodent or animal trap and an associated cage detachably supported thereby, which will be be highly efficient in operation and relatively inexpensive to manufacture and produce.

Other objects will appear as the description proceeds.

In the accompanying drawings which form a part of this application—

Figure 1 is a perspective view of the improved rodent or animal trap and cage;

Figure 2 is a sectional view taken on the line 2—2 of Figure 4;

Figure 3 is a similar sectional view as shown in Figure 2 except that the parts of the trap are shown in sprung position;

Figure 4 is a sectional view taken on the line 4—4 of Figure 2;

Figure 5 is a side elevation of the inlet end of the improved trap showing the flap closure operating linkage on the side thereof;

Figure 6 is a sectional view taken on the line 6—6 of Figure 1;

Figure 7 is a side elevation of the inlet end of

2 the improved trap showing the position of the linkage when the trap is being reset;

Figure 8 is a sectional view similar to that shown in Figure 6, but with the exit flap closures between the trap and cage in raised position;

Figure 9 is a view partly in section taken on the line 9—9 of Figure 1;

Figure 10 is a sectional view taken on the line 10—10 of Figure 9, and

Figure 11 is a perspective view of the entrance and exit flap closures with connecting linkage therefor.

Like characters of reference are used throughout the following specification and the accompanying drawings to designate corresponding parts.

In carrying out the invention, there is provided an improved form of victim reset animal trap and an associated cage compartment including a trap body of substantially U-shape in cross-section being generally designated by the reference numeral 1, the same having a bottom 2 and parallel upwardly extending opposite sides 3 and 4.

The top of the trap body 1 will be completely covered by heavy wire screen 5 from end to end. The inlet end of the trap will be open while the opposite end thereof will be closed by a mirror 6 extending transversely thereof, whereby a rodent or animal will be able to see its image or reflection in the mirror when caught in the trap, or when entering the trap.

The bottom 2 of the trap 1 is provided with a transverse notch 7 adjacent its front end that receives the wedge-shape bait holding platform or trigger 8 which is pivotally supported upon the oppositely extending pivot pins 9 secured in the slides 3 and 4 of said trap 1. A cord 10 is attached to the bottom of the platform or trigger 8 at its forward end, and extends toward the entrance of the trap through an angled passage 11, and supports the bait 12 at its end adjacent the floor of the trap.

An automatic release wire or holding bar 13 will be bent inwardly to be received in the side inner edge of the platform or trigger 8, and will extend upwardly at an angle toward the trap entrance passing through the vertical wire guide and holder 14 attached to the inner wall of the trap 1 and secured by the staple 15 which overlies the outer bent terminal end portion of said guide or holder 14.

A pair of adjacent trap entrance closure flaps 16 and 17 will be supported upon the transversely extending shafts 18 and 19, respectively, and will be adapted to swing inwardly. The lower free edge of the flap closure 16 will be serrated to form the teeth 20, and is arranged to be supported together with the free or inner end of the flap closure 17 upon the forward end of the release wire 13 when the trap is set.

The outer end of the shaft 19 will be bent to form a crank 21 which will cooperate with and engage the crank portion 22 on the front end of the longitudinally extending closure flap operating rod or shaft 23. A staple 24 is driven about the rod or shaft 23 into the side 4 of the trap 1, and serves as a front bearing support for said rod or shaft. An exit closure or contact flap 25 is secured to the rear end of the operating rod or shaft 23, and will be disposed at the rear end of the trap to cooperate with the exit opening 26 formed through the rear side wall 4 of said trap 1. The rear end of said rod or shaft 23 will be supported by a suitable staple (not shown) similar to the bearing staple 24 at its forward end.

An inner closure or retainer flap 27 will be pivotally supported on the shaft 28 extending into and between the side walls of said exit opening 26, lying in spaced parallel relation to the exit closure flap 25. The lower edge of the closure flap 27 will be slightly bent and the lower edges of both closure flaps 27 and 25 will be centrally notched as at 29 and 30, respectively, in order that a trapped rodent or animal may see into the cage compartment and will force the closure flaps 27 and 25 upwardly as it passes into the cage compartment. One or more protected bait containers 31 will be disposed in the inner end of the trap 1, being attached to the floor 2 thereof by means of the screws 32, and each will hold a suitable bait 33.

A pair of spaced laterally extending parallel cage supporting arms 34 and 35 will be fixed to the side 4 of the trap 1 adjacent its rear end, and will be adapted for slidable positioning between the spaced horizontally extending vertically disposed parallel supporting arms 36 and 37 secured to the opposite sides 38 and 39 of the cage compartment generally denoted by the reference numeral 40.

The cage compartment 40 is substantially rectangular in shape, being provided with the opposite sides 38 and 39, an inner wall or side 41, an outer wall or side 42, a top 43, and a bottom 44. A suitable aperture 45 will be provided in the inner wall or side 41 for aligning with the exit opening 26 in the trap 1, and a sealing collar 46 will be disposed about the aperture 45, the same being slotted at 47 to receive the vertically adjustable slide door 48 which will be inserted in position immediately prior to removing the cage compartment 40 from the trap 1 when it is necessary to remove the trapped rodents or animals therefrom.

Locking pins 49 will be removably disposed in the alignable openings 50 and 51 formed respectively through the arms 34 and 35, and the spaced arms 36 and 37.

One of the arms 36 will be notched out as at 52 to permit the operating rod or shaft 23 to clear the same when the cage compartment 40 is attached to the trap 1.

In practical use of the present invention, the flaps 25 and 27 are lowered as shown in Figure 6 and the entrance closure flaps 16 and 17 are held raised by the release wire 13 with the upper surface of the platform 8 substantially flush with the upper surface of the bottom 2, as shown in Figure 2.

As an animal enters the trap and steps upon the rear end portion of the platform 8, the platform will rock to the position shown in Figure 3 causing the wire 13 to pass from under the flaps 16 and 17, whereupon the flaps 16 and 17 swing downwardly against the bottom 2. The lower edges of the flaps 16 and 17 engage the bottom 2 rearwardly of the pivots 18 and 19 for the flaps 16 and 17, so that an animal attempting to open the flaps 16 and 17 by pushing the flaps forwardly, will only tend to force the lower edges of the flaps 16 and 17 against the bottom 2.

Since the trapped animal cannot pass through the entrance for the trap, the trapped animal moves rearwardly attempting to locate an exit. The animal will then move into cage compartment 40 and in so doing will raise the flaps 25 and 27 which will effect a rotation of the rod 23 and a raising of the crank 22, the crank portion 21 and the flaps 16 and 17. The flaps 16 and 17 will ride over the wire 13 and will then be held by the wire 13 in a raised position until the platform is again rocked.

After the animal has entered the cage compartment 40, the flaps 25 and 27 will gravitate to their lowered position to be again raised, as an animal enters the cage compartment 40.

From the foregoing description, it will be apparent that there has been devised and provided a highly efficient form of rodent or animal trap and cage which will be relatively inexpensive to manufacture and produce.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention, what I claim as new and desire to secure by Letters Patent of the United States is:

1. An animal trap comprising a substantially channel shaped runway including a bottom wall and also forward and rear end portions, the end portion of said runway being normally open and a mirrored panel at the rear portion of said runway, said runway having an opening in its bottom wall adjacent the forward end portion of said runway, a wedge pivotally mounted in said opening and including a lower flat surface and an inclined upper surface, the lower surface of said wedge being normally coplanar with the outer surface of the bottom wall of said runway, a flexible element anchored at one end to the lower surface of said wedge adjacent the rear end thereof, the bottom wall of said runway having a forwardly inclined aperture receiving the free end of said flexible element, a hinged closure for the forward end portion of said runway, an arm carried by the wedge and adapted to engage said closure for normally retaining the same in an open position, said arm being adapted to release said closure upon tipping of said wedge whereby said closure is urged to a closed position, and a wire mesh stretched over said runway.

2. An animal trap comprising a substantially channel shaped runway including a bottom wall and also forward and rear end portions, the end portion of said runway being normally open and a mirrored panel at the rear portion of said runway, said runway having an opening in its bottom wall adjacent the forward end portion of said runway, a wedge pivotally mounted in said opening and including a lower flat surface and an inclined upper surface, the lower surface of said wedge being normally coplanar with the outer surface of the bottom wall of said runway, a flexible element anchored at one end to the lower surface of said wedge adjacent the rear end thereof, the bottom wall of said runway having a forwardly inclined aperture receiving the free end of said flexible element, a hinged closure for the forward end portion of said runway, an arm carried by the wedge and adapted to engage said closure for normally retaining the same in an open position, said arm being adapted to release said closure upon tipping of said wedge whereby said closure is urged to a closed position, an outer closure hinged to said runway adjacent the forward end portion thereof and adjacent said first mentioned closure, and means for pivoting said outer closure to an open position for simultaneously opening both of said closures.

3. An animal trap comprising a substantially channel shaped runway including a bottom wall and also forward and rear end portions, the end portion of said runway being normally open and a mirrored panel at the rear portion of said runway, said runway having an opening in its bottom wall adjacent the forward end portion of said runway, a wedge pivotally mounted in said opening and including a lower flat surface and an inclined upper surface, the lower surface of said wedge being normally coplanar with the outer surface of the bottom wall of said runway, a flexible element anchored at one end to the lower surface of said wedge adjacent the rear end thereof, the bottom wall of said runway having a forwardly inclined aperture receiving the free end of said flexible element, a hinged closure for the forward end portion of said runway, an arm carried by the wedge and adapted to engage said closure for normally retaining the same in an open position, said arm being adapted to release said closure upon tipping of said wedge whereby said closure is urged to a closed position, an outer closure hinged to said runway adjacent the forward end portion thereof and also adjacent said first mentioned closure, a pivot pin for said outer closure having a terminal crank, a longitudinally disposed operating rod having a crank portion at one end adapted to engage the crank of said pin, means carried by said runway rotatably supporting said operating rod, and means for rotating said rod for raising said outer closure.

4. A trap comprising a cage, an enclosed runway leading to the cage and having an entrance opening, a bottom wall for the cage and runway, a pivotal platform carried by the runway, a swinging closure carried by the runway for closing the entrance opening, a holding member carried by the platform for normally retaining the closure in an open position, means carried by the runway for guiding the movement of the holding member during pivotal movement of the platform, a retainer flap pivotally carried by the runway adjacent the cage for swinging movement toward the cage, a pivotal contact flap carried by the runway and interposed between the retainer flap and the cage for swinging movement into the cage, an operating rod carried by the contact flap and actuated by the swinging movement of the latter, a pivotal closure flap carried by the runway adjacent the entrance opening for engaging the closure, and a crank carried by the closure flap engaging the pusher member for actuating the closure flap upon swinging movement of the contact plate into the cage.

5. A trap comprising a cage, an enclosed runway leading to the cage including a bottom wall and an entrance opening, said bottom wall having a transverse notch, a pivotal platform carried by the runway for rocking movement in the notch, a swinging closure carried by the runway for closing the entrance opening, said platform having a side edge, a holding bar having a bent end received in the side edge of the platform, said holding bar normally holding the closure in an open position, a guide carried by the runway slidably engaging the holding bar, a pivotal retainer flap carried by the runway between the cage and the platform for swinging movement toward the cage, a contact flap pivotally carried by the runway between the retainer flap and the cage for swinging movement into the cage, an operating rod actuated by the swinging movement of the contact flap, a closure flap pivotally carried by the runway, and a crank carried by the closure flap actuated by the operating rod for raising the closure flap to engage the closure with the holding bar.

JUDSON C. HONEYCUTT.

REFERENCES CITED

The following references are of record in the file of this patent:

UNITED STATES PATENTS

| Number | Name | Date |
| --- | --- | --- |
| 140,036 | Hair | June 17, 1873 |
| 488,111 | Bromwell | June 13, 1892 |
| 518,841 | Hay | Apr. 24, 1894 |
| 606,052 | Davidson | June 21, 1898 |
| 899,114 | Lipp | Sept. 22, 1908 |
| 1,051,469 | Voss | Jan. 28, 1913 |
| 1,235,833 | Moore | Aug. 7, 1917 |
| 1,249,242 | Tabor | Dec. 4, 1917 |
| 1,677,470 | Dorsch et al. | July 17, 1928 |